United States Patent [19]

Yamaoka et al.

[11] Patent Number: 4,781,259

[45] Date of Patent: Nov. 1, 1988

[54] AXLE DRIVING APPARATUS

[75] Inventors: Kojiro Yamaoka, Nishinomiya; Shusuke Nemoto, Yao, both of Japan

[73] Assignee: Kanzaki Kokyukoki Mfg. Co. Ltd., Amagasaki, Japan

[21] Appl. No.: 923,118

[22] Filed: Oct. 24, 1986

[30] Foreign Application Priority Data

Oct. 25, 1985 [JP] Japan ................................ 60-239757
Oct. 25, 1985 [JP] Japan ........................... 60-164836[U]
Oct. 25, 1985 [JP] Japan ........................... 60-164837[U]

[51] Int. Cl.⁴ ....................... B60B 35/16; F16D 55/08
[52] U.S. Cl. ........................................ 180/75; 180/88; 74/606 R; 188/72.9; 188/72.1
[58] Field of Search ..................... 74/607, 606 R, 344; 180/70.1, 75, 88; 188/72.1, 72.9, 71.1

[56] References Cited

U.S. PATENT DOCUMENTS

| | | | |
|---|---|---|---|
| 1,481,385 | 1/1924 | Nilson et al. | 188/72.1 |
| 2,791,912 | 5/1957 | Bixby | 74/344 |
| 3,339,662 | 9/1967 | Hanson et al. | 180/70.1 |
| 3,494,225 | 2/1970 | Binder | 180/75 |
| 3,766,722 | 10/1973 | Kamulukin et al. | 56/11.6 |
| 4,281,942 | 8/1981 | Gaeckle | 403/288 |
| 4,304,141 | 12/1981 | Tone et al. | 180/53.1 |
| 4,449,424 | 5/1984 | Hauser | 74/606 R |
| 4,513,834 | 4/1985 | Hayashi et al. | 180/70.1 |

Primary Examiner—David M. Mitchell
Assistant Examiner—Karin Ferriter
Attorney, Agent, or Firm—Saidman, Sterne, Kessler & Goldstein

[57] ABSTRACT

Construction of an axle driving apparatus disposing therein left and right driving axles and differential gears of a traveling vehicle. The driving case of the axle driving apparatus is formed of aluminum die casting to enable assembly by reducing machined portions as much as possible, and divided into a first driving case and a second driving case by a parting line P passing through the center of the axle, so that the built-in surface along the parting line P is used to put, between the split portions, the differential gear or other part, thereby enabling the assembly and saving the manhours for the assembly work.

10 Claims, 10 Drawing Sheets

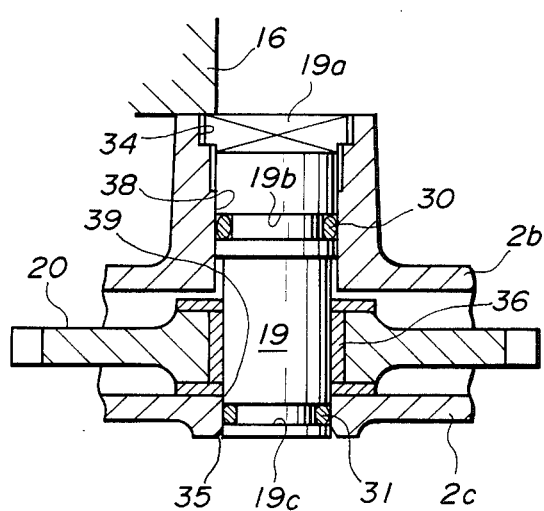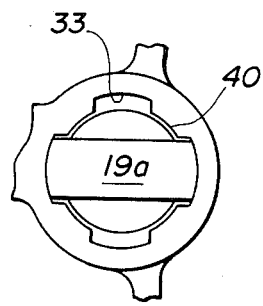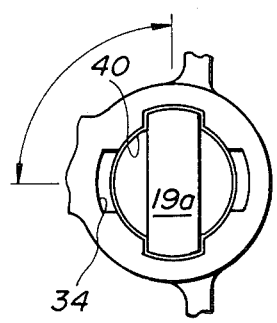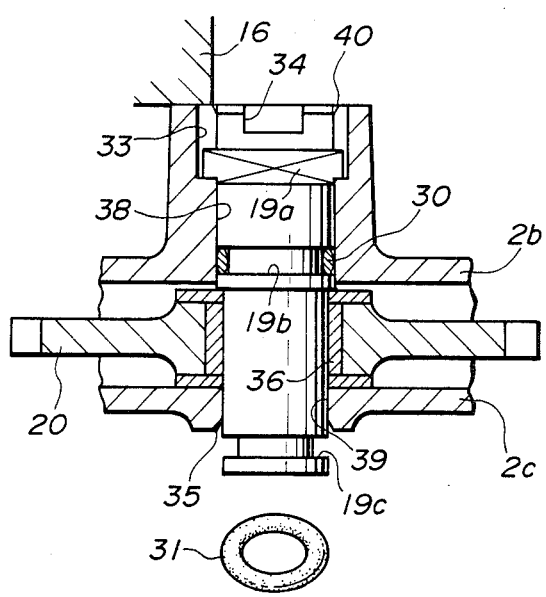

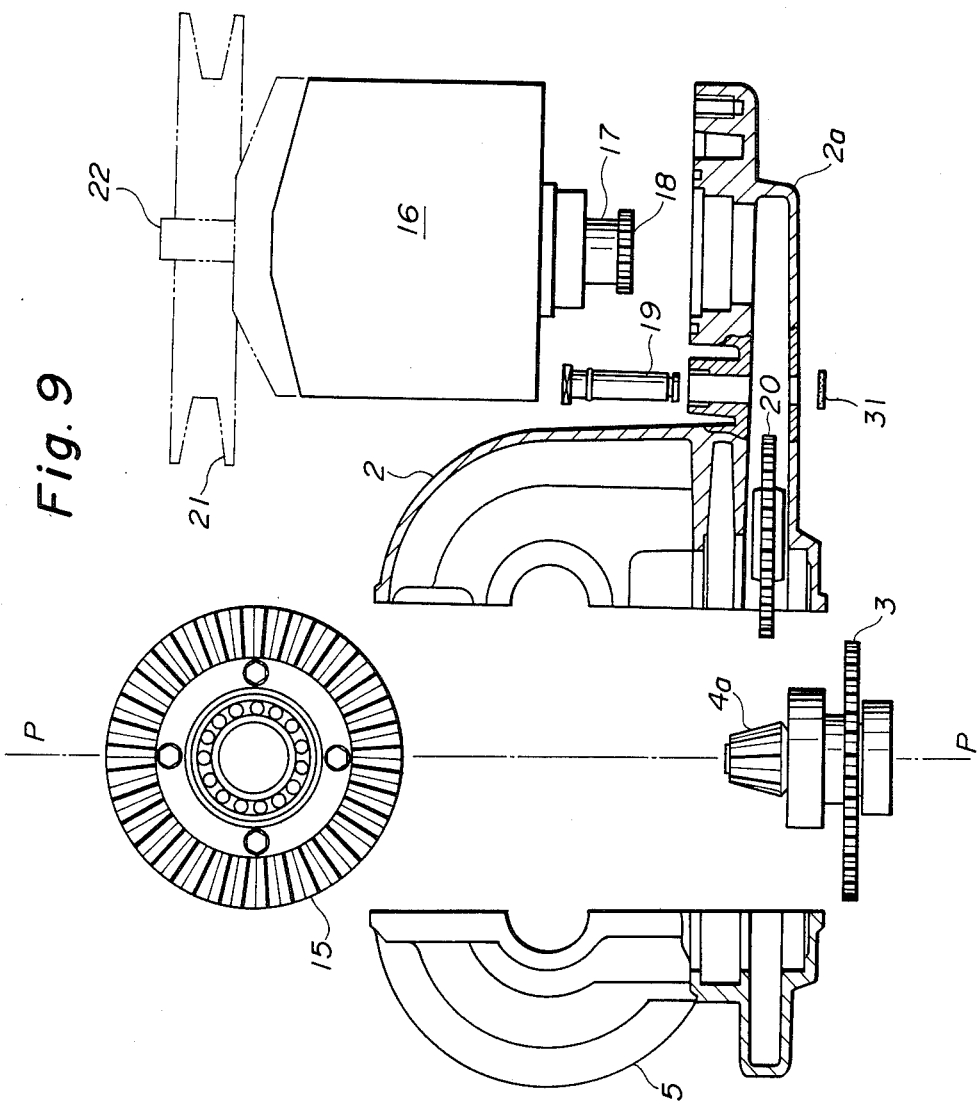

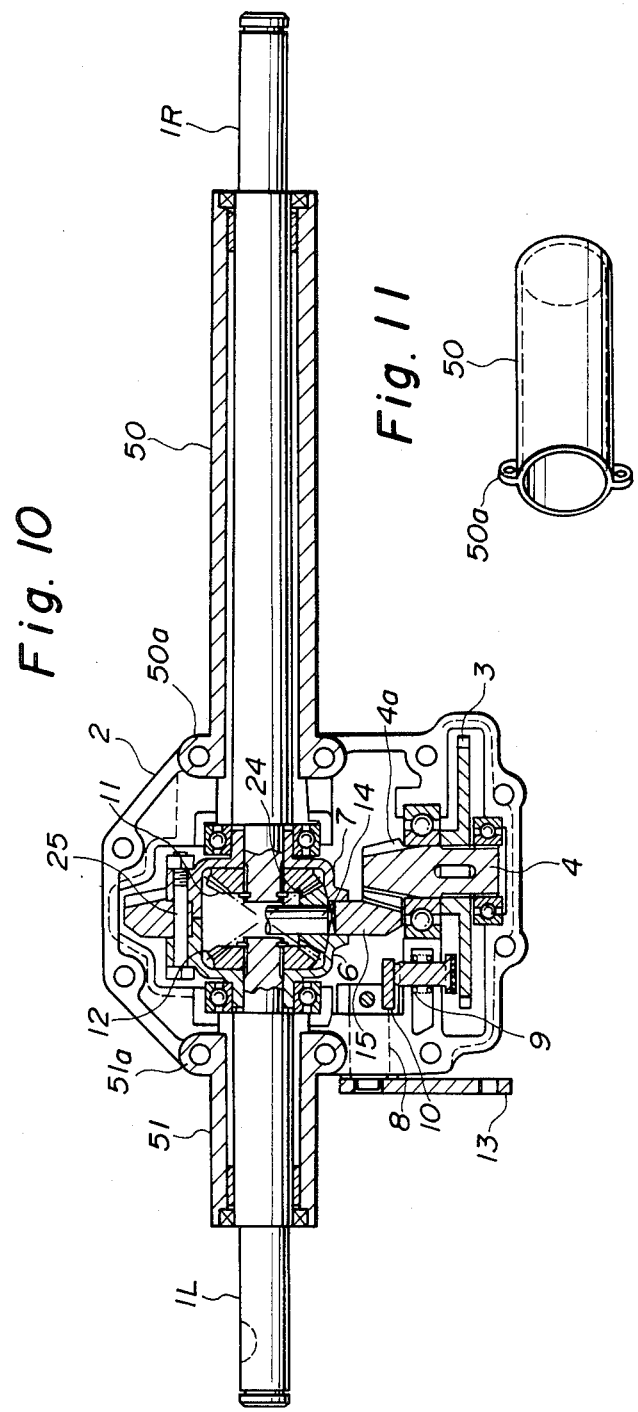

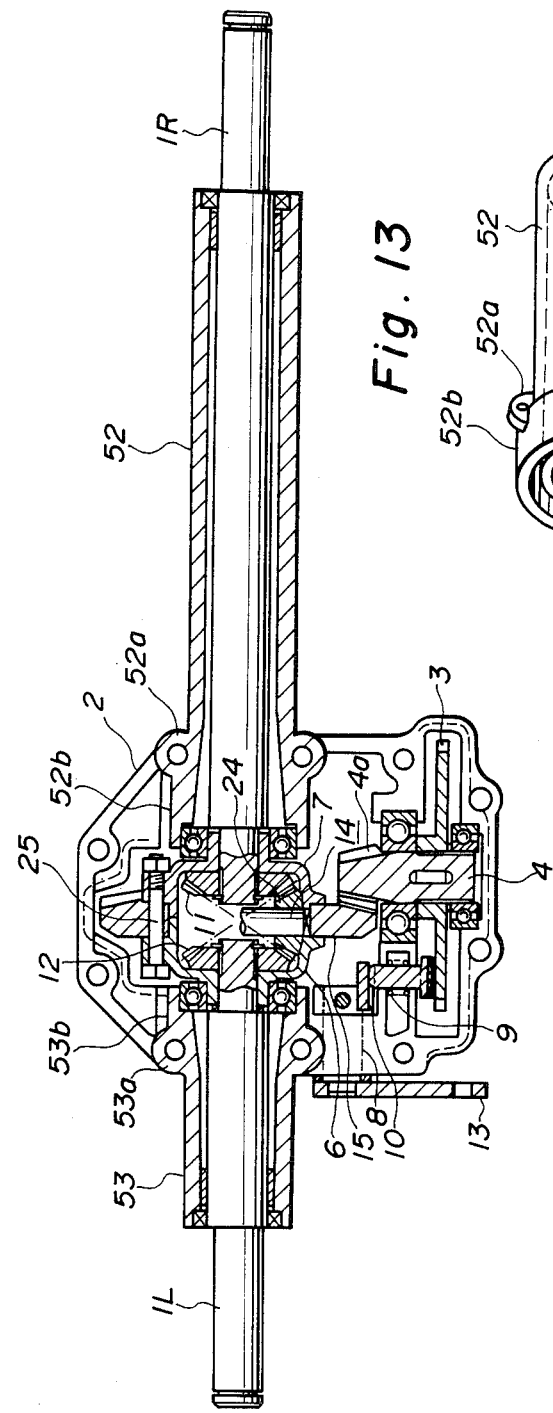
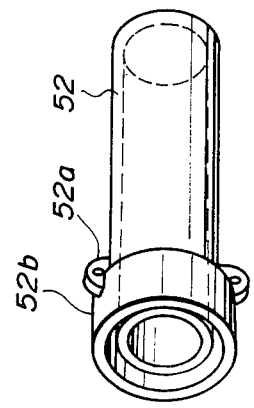
Fig. 12
Fig. 13

AXLE DRIVING APPARATUS

BACKGROUND OF DISCLOSURE

Conventionally, the axle driving apparatus for a light tractor, as the well-known prior art, is disclosed in the U.S. Pat. No. 4,513,834, which attaches a stepless transmission to the side surface of the driving case, so that an output shaft of the stepless speed change device is inserted into the driving case to drive differential gears to drive the axle.

Such conventional construction, however, couples the first driving case for reducing a power from a HST (hydrostatic transmission) with the second driving case housing therein the differential gears, in which the respective driving cases form a bearing and incorporate a transmission gear and differential gears and then are coupled with each other, whereby the assembly is complicated to take much time, resulting in that the axle driving apparatus is expensive to produce.

Also, a traveling brake means is provided at the outside of the driving case, which is dangerous in construction.

The present invention has improved the aforesaid matters.

SUMMARY OF THE INVENTION

An object of the present invention is to provide an axle driving apparatus for a traveling vehicle, which manufactures a driving case with aluminum die casting and requires no machining, so that the axle driving apparatus having priority in the manufacturing cost of the vehicle is inexpensive to produce.

In detail, in the present invention, an axle driving apparatus for the traveling vehicle divides into two its driving case housing therein differential gears, the differential gears and differential pinion shaft are supported in a sandwiching manner between both split driving cases when they are assembled, whereby the conventional separate rear axle housing or a bearing case is not required and the man-hours for assembly work is reduced.

Another object of the invention is to provide a brake means in a traveling vehicle, such as a garden tractor, which eliminates the excess braking action and demonstrates the minimum function, is inexpensive to produce, and exerts the reliable braking action.

A further object of the invention is to provide an axle driving apparatus for a traveling vehicle which utilizes the advantage of the aluminum die casting to enable the assembly without machining, so that a guide groove for an O-ring is not formed at the inside of the case and only a guide groove formed as the casting surface on the outside surface enables the gear shaft to be assembled between a shaft insertion bore and the shaft without cutting the O-ring.

These and other objects of the invention will become more apparent in the detailed description and examples which follow.

BRIEF DESCRIPTION OF THE DRAWINGS

FIG. 5 is a sectional side view showing a bearing structure of a counter gear shaft, FIG. 6 is a plan view thereof, FIG. 7 is a sectional side view of said bearings during the assembly, FIG. 8 is a plan view of the counter gear in FIG. 7, FIG. 9 is an exploded side view of the axle driving apparatus of the invention, FIG. 10 is an exploded sectional rear view of a modified embodiment of an axle driving apparatus of the invention, in which an axle case is a separate part formed of a pipe and tightly fixed together with a front wheel driving case and a rear wheel driving case when tightened, FIG. 11 is a perspective view of the axle case, FIG. 12 is an exploded sectional rear view of another modified embodiment of the axle case, FIG. 13 is a perspective view of the axle case in FIG. 12.

DETAILED DESCRIPTION OF THE PREFERRED EMBODIMENT

The axle driving apparatus of the invention will be detailed in accordance with the embodiment shown in the accompanying drawings.

Figure 1:
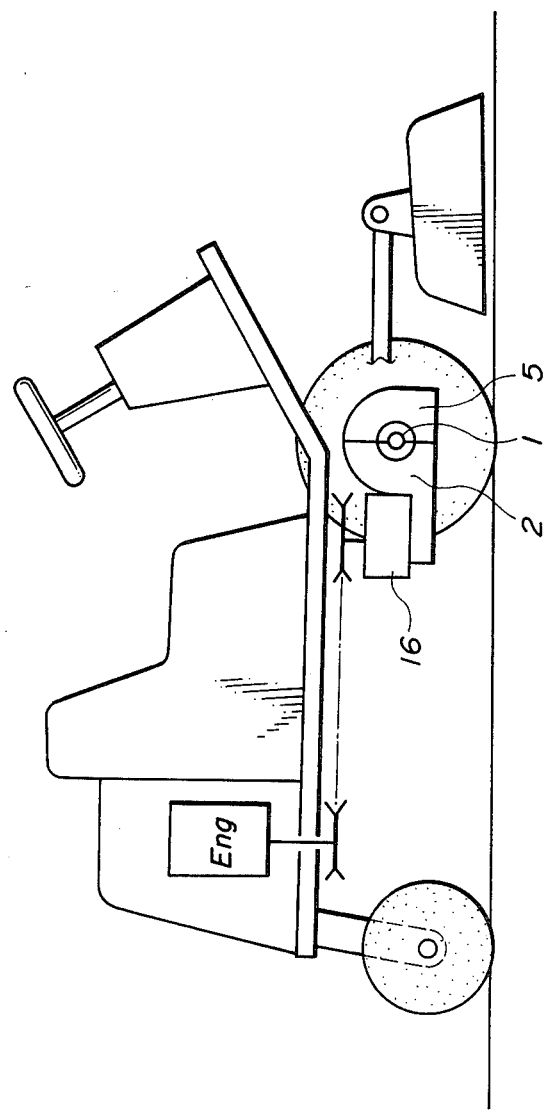
FIG. 1 is a general side view of a front wheel driving type traveling working vehicle on which an axle driving apparatus of the invention is mounted.

FIG. 1 is a side view of a traveling working vehicle on which the axle driving apparatus of the invention is mounted.

Figure 2:
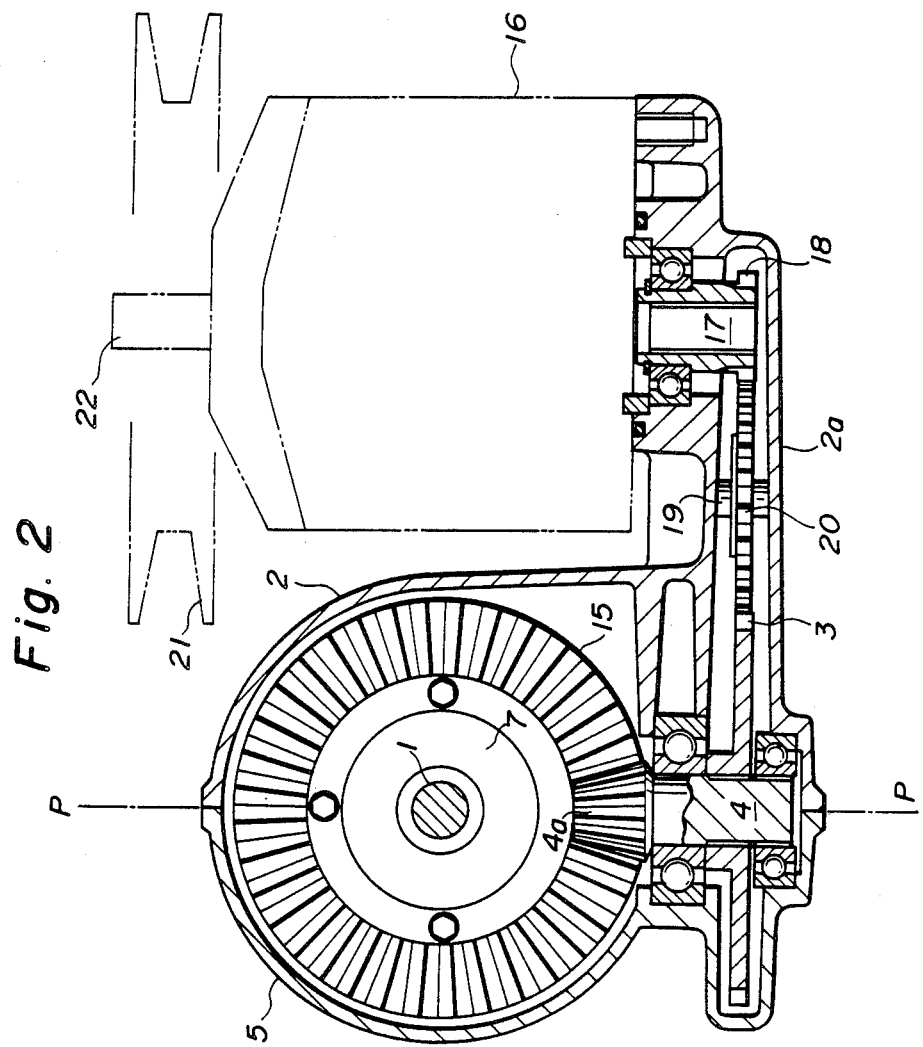
FIG. 2 is a sectional side view of an embodiment of the axle driving apparatus of the invention.
Figure 3:
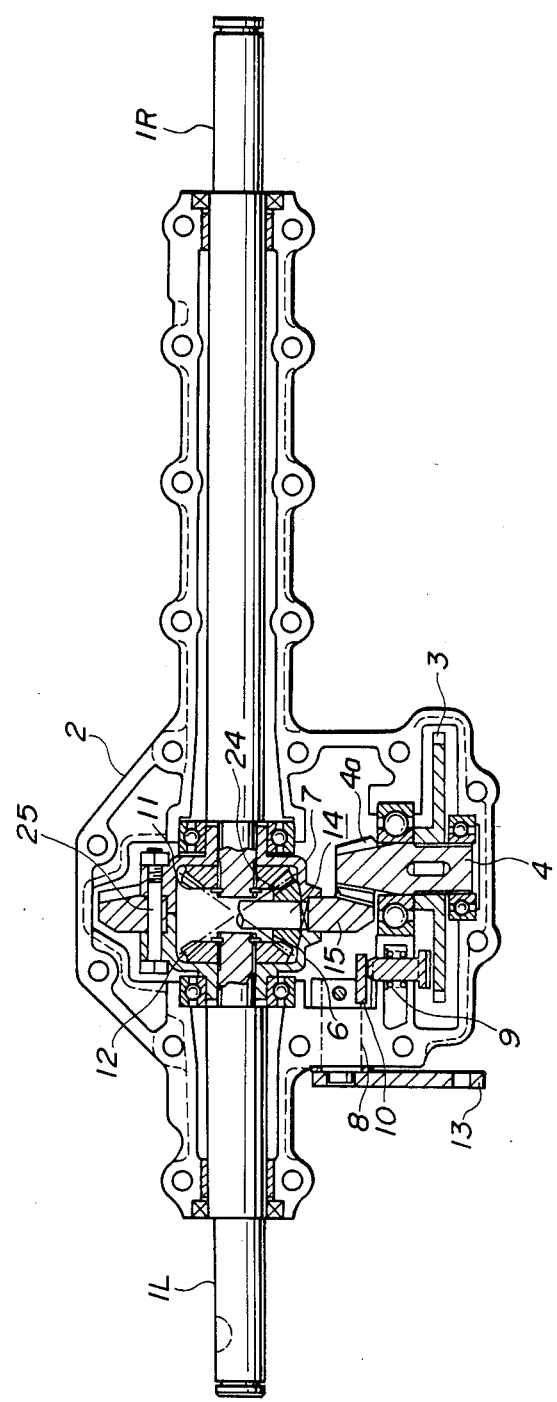
FIG. 3 is a rear view of the axle driving apparatus in FIG. 2, which is divided by a parting line P into two.
Figure 4:
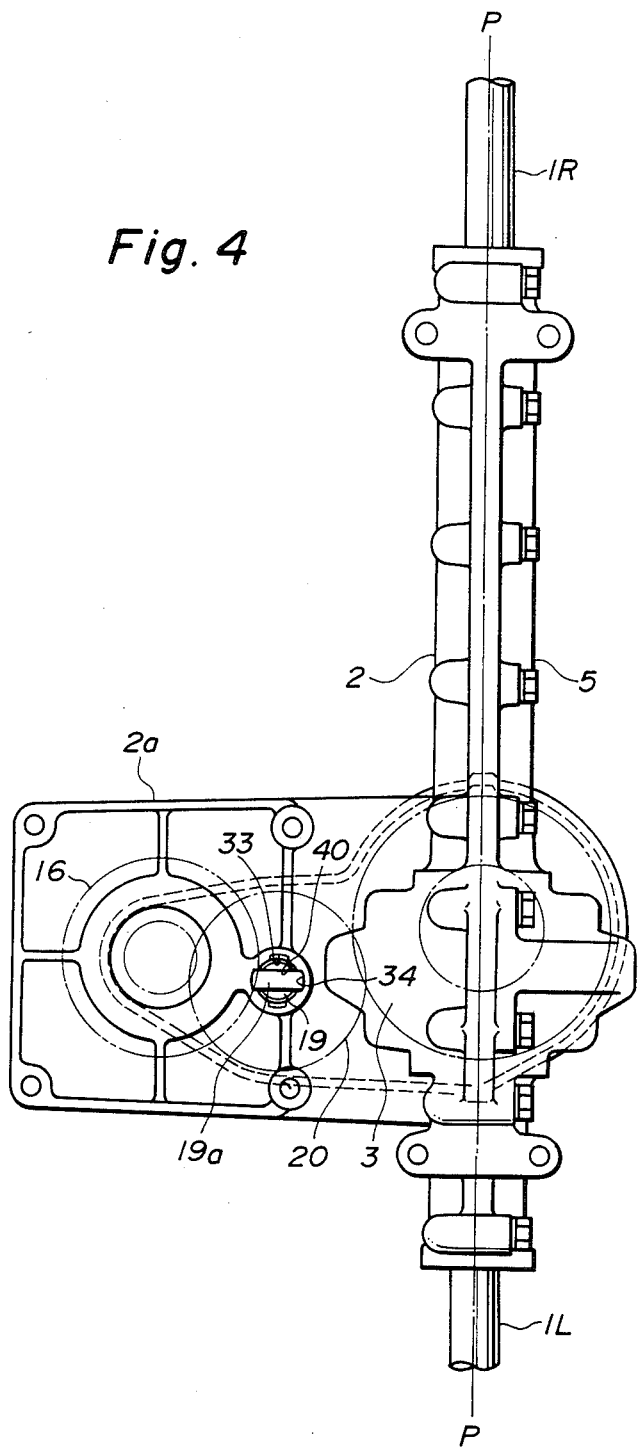
FIG. 4 is a general plan view of the same.

Referring to FIGS. 2, 3 and 4, a driving case of the invention is divided laterally in FIG. 2 into a first driving case 2 and a second driving case 5.

The first driving case 2 is cast at its lower portion to form a hollow extension 2a and a stepless speed change device 16 is placed thereon.

The stepless speed change device 16 in this embodiment comprises a HST type transmission which uses a pump shaft as an input shaft 22 and a motor shaft as an output shaft 17 and disposes a pump and a motor in parallel.

A V-pulley 21 is fixed on the input shaft 22 so that a driving force is transmitted from an engine of the traveling vehicle to the input shaft 22 through a V belt.

The rotation after stepless speed change in the front-rear direction by the stepless speed change device 16 is transmitted to the first driving case 2 from the output shaft 17 serving as the motor shaft.

A gear 18 is fixed to the utmost end of the output shaft 17 inserted into the front portion at the hollow extension 2a of the first driving case 2, the gear 18 engaging with a counter gear 20. The counter gear 20 is supported in the vicinity of the center of the extension 2a at the first driving case 2 by a counter shaft 19, and engages with between a gear 3 fixed to the differential pinion shaft 4 and the gear 18 at the output shaft 17, so that the rotational speed of the output shaft 17 is reduced and the rotation thereof is transmitted to the differential pinion shaft 4.

The differential pinion shaft 4 is vertically disposed in the relation that the axis thereof is nearly coincident with the parting line P, and put between the abutting surfaces of the first and second driving cases 2 and 5 through bearings disposed at the upper and lower sides of the gear 3. An upper end of the pinion shaft 4 is toothed to form a pinion 4a which engages with a differential ring gear 15 at the differential gear unit.

As seen from the above description and FIG. 2, the second driving case 5 is provided with a cast cavity which can house therein left halves of the different gear unit, axles 1L and 1R, differential pinion shaft 4 and gear 3 respectively.

The first driving case 2 is provided with a cast cavity which can house therein right halves of the differential gear unit, axles 1L and 1R, differential pinion shaft 4 and gear 3. The cavity housing therein the gear 3 is extended to form a cavity in the extension 2a so as to be cast to house therein the counter gear 20 and gear 18. Furthermore, an insertion bore through which the output shaft 17 at the stepless speed change device 16 enters into the aforesaid cavity is casted at the upper wall of the extension 2a.

As shown in FIG. 3, a friction pin 9 is disposed above the gear 3 at the differential pinion shaft 4, at which portion a traveling brake means is formed.

Next, explanation will be given on how to assemble and support to the extension 2a the counter gear shaft 19 pivotally supporting the counter gear 20 in accordance with FIGS. 4 through 8.

An insertion bore 38 at the extension 2a is provided with a deep groove 33 and a shallow groove 34, so that a retaining knob 19a projecting from the upper end of counter gear shaft 19 is fitted into either the deep groove 33 or the shallow groove 34 to thereby fix the counter gear shaft 19 in position.

At first, an O-ring 30 is fitted into an upper O-ring groove 19b. The counter gear shaft 19 is inserted from the upper insertion bore 38 at the extension 2a along an O-ring guide surface 40 formed upwardly from the outside surface of a bearing wall 2B, and then passes a bearing 36 at the gear 20. In this state, when the retaining knob 19a is fitted into the deep groove 33, the counter gear shaft 19, as shown in FIG. 7, projects at the utmost end from the lower end of the bearing wall 2c, so that a lower O-ring groove 19c is exposed.

Next, after an O-ring 31 is fitted into the O-ring groove 19c, the counter gear shaft 19 is pulled upwardly by the retaining knob 19a, so that the O-ring 31 is guided through an O-ring guide surface 35 which is formed downwardly at the lower surface of the bearing wall 2c, thereby being inserted into the lower shaft-insertion bore 39 without being cut. In addition, reference numeral 36 designates a bearing bush.

Then, as shown in FIG. 5, after the O-ring 31 is fitted into the insertion bore 39, the retaining knob 19a is rotated at an angle of 90° and fitted into the shallow groove 34, thereby locking the counter gear shaft 19 not to fall down. In this state, the stepless speed change unit 16 fixed onto the extension 2a is disposed at one end thereof above the counter gear shaft 19, thereby locking the counter gear shaft 19.

In the aforesaid construction, both the O-ring guide surfaces 40 and 39 for preventing the O-rings 30 and 31 necessary to be fitted into the upper and lower O-ring grooves 19b and 19c at the counter gear shaft 19 from being cut, can be provided in the direction of opening at the outer surface of the first driving case 2, thereby enabling the axle driving apparatus to be manufactured in aluminum die casting.

In case that the counter gear shaft 19 does not project once outwardly at the end thereof and the O-ring 31 is not fitted into the lower groove 19c, the O-ring guide surface 35 is provided at the inner surface of the bearing wall 2b, in which it is difficult to insert a tool for machining the O-ring guide surface 35 into the cavity at the extension 2a. In this case, if the extension 2a is vertically divided, the apparatus is the same as the conventional one so as not to expect saving in the number of parts or simplification of assembly process.

Figure 15:
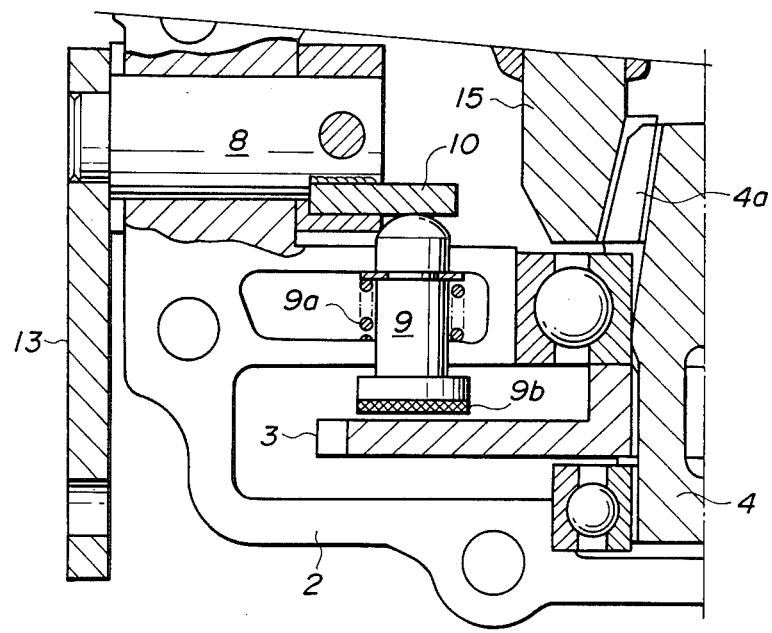
FIG. 15 is an enlarged sectional side view of a traveling brake means.
Figure 16:
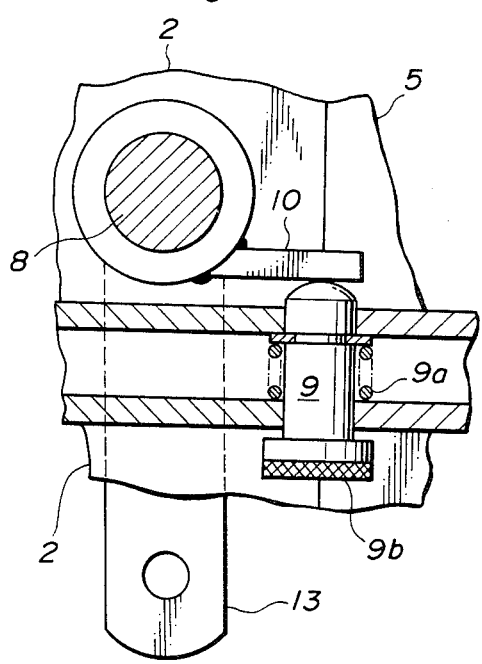
FIG. 16 is an enlarged rear view of the same.
Figure 17:
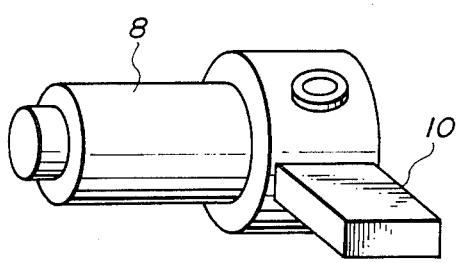
FIG. 17 is a perspective view of a brake arm shaft.

Next, explanation will be given on a traveling brake means on the basis of FIGS. 15, 16 and 17.

The traveling brake means comprises a friction pin 9, a rotary arm 10, a brake arm shaft 8 and a brake arm 13, the friction pin 9 being supported at each axial half into each semicircular bore formed at the abutting surfaces of the axles 1L and 1R at the front driving case 2 and rear driving case 5, so that the semicircular bores are formed cylindrical after the assembly of both the driving cases 2 and 5 to thereby insert the friction pin 9 in the cylindrical bore.

The brake arm 13 fixed to the brake arm shaft 8 projects outwardly from the first driving case 2.

The walls supporting the friction pin 9 are casted and formed in each semicircular bore at the contact surfaces of the first and second driving cases 2 and 5 so that the friction pin 9, around which a brake release spring 9a is wound, is inserted into the bore formed of the semicircular contact surfaces. The brake release spring 9a wound around the friction pin 9 abuts at the upper end against a snap ring engaging with the friction pin 9, and a friction plate 9b is spaced apart from the upper surface of the gear 3. Also, the friction pin 9 projects at the tip thereof from the upper surface of a wall 26 and is biased by the spring 9a to abut against the rotary arm 10.

The brake arm 13 is rotated to rotate the rotary arm 10 to push the friction pin 9 downwardly against the brake release spring 9a so as to bias the friction plate 9b toward the upper surface of the gear 3, thereby exerting the braking action.

Such construction can allow ready assembly of the friction pin 9 in the traveling brake means and also the gear 3 serves as the friction plate 9b to be biased by the friction pin 9, whereby the traveling brake means is simple in construction and inexpensive to produce is obtainable.

In the embodiment in FIG. 3, a differential case at the differential gear unit comprises left and right differential cases 6 and 7 of the same configuration. Thus, the differential cases 6 and 7 of similar parts lead to a low manufacturing cost. A bevel gear shaft 14 supporting a bevel gear 24 is inserted into the differential case, a differential ring gear 15 is mounted on the outside of the same, and the left and right differential cases 6 and 7 are tightened by a long bolt perforating the cases 6 and 7 when assembled.

The bevel gear 24 on the bevel gear shaft 14 engages with differential side gears 12 and 11 to transmit the differential rotation to the left and right axles 1L and 1R, the axles 1L and 1R serving also as the left and right differential side gear shafts.

In FIG. 9, the respective main parts constituting the axle driving apparatus of the invention are exploded and shown. The axles 1L and 1R, differential gear unit, differential pinion shaft 4 and friction pin 9 are put on the parting line P and between the first driving case 2 and the second driving case 5.

Also, in the embodiment in FIG. 3, the axle cases similarly divided into two are integral with the first and second driving cases 2 and 5, while, in the modified embodiment in FIG. 10, the axle cases 50 and 51 are separate and each formed of a pipe, and at the inner ends of the axle cases 50 and 51 are formed a pair of tongues 50a and 51a disposed in coincidence with the parting line P as shown, so that when the first and second driving cases 2 and 5 are assembled, the tongues 50a and 51a are tightened by bolts respectively.

FIG. 11 is a perspective view of the axle case 50 formed of the pipe.

Next, in the modified embodiment in FIG. 12, the axle cases 52 and 53 are provided at the inner ends thereof and further inwardly from tongues 52a and 53a with left and right bearing portions 52b and 53b integral with the cases 52 and 53 respectively.

Figure 14:
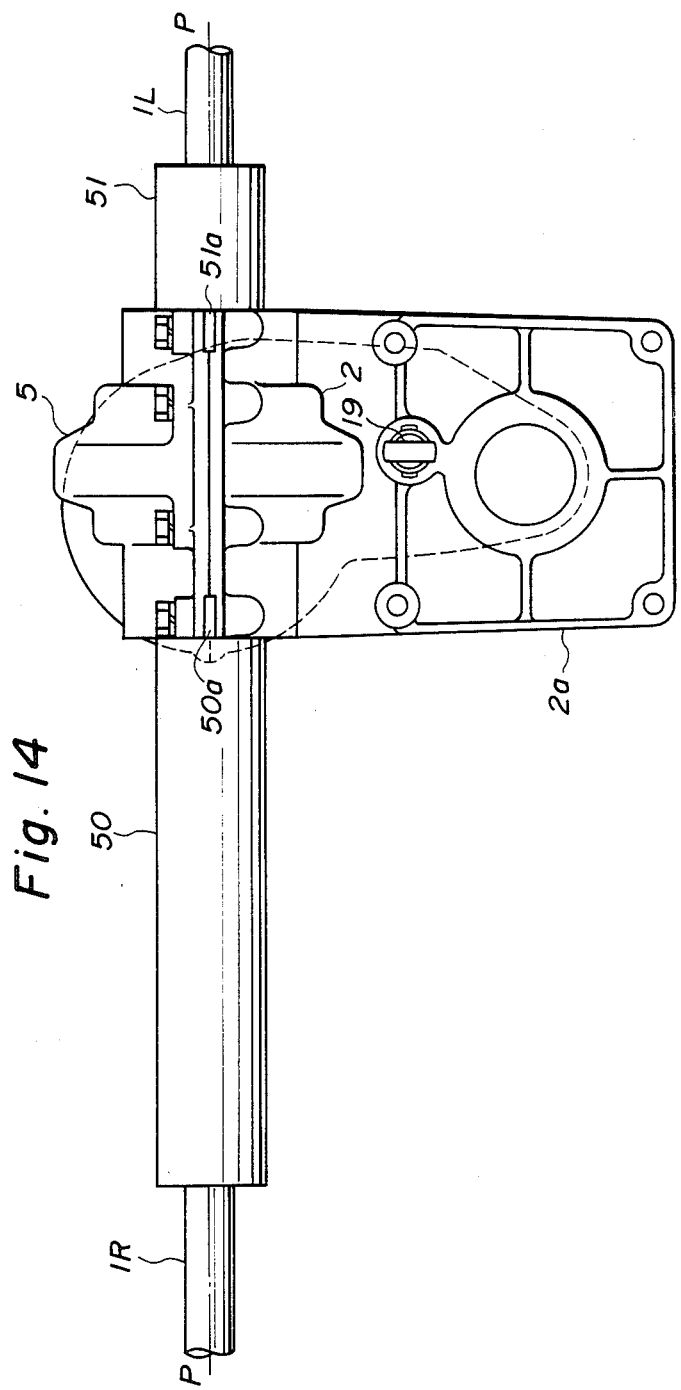
FIG. 14 is an upper view of the embodiments of the entire axle driving apparatus.

In addition, FIG. 13 is a perspective view of the axle case 52 in the FIG. 12 embodiment, and FIG. 14 is a plan view of the embodiment in FIGS. 10 and 12.

Although the invention has been described with reference to several different embodiments, these embodiments are merely exemplary and not limiting of the invention which is defined solely by the appended claims.

What is claimed is:

1. An axle driving apparatus, comprising a driving case, a differential gear unit and a vertically disposed differential pinion shaft located in said driving case, said driving case being divided into a first driving case and a second driving case wherein the intersection of said first driving case and said second driving case lies in a plane that passes through the longitudinal axis of an axle, wherein said differential gear unit and said differential pinion shaft are held between said first driving case and said second driving case, said first driving case being provided with an extension having a cavity, said extension having disposed at the outside surface thereof a stepless speed change device having an output shaft wherein said extension additionally provides means for interfacing said output shaft with a transmission mechanism for driving said differential pinion shaft in said cavity.

2. An axle driving apparatus according to claim 1, comprising: a friction pin placed between said driving cases, said friction pin being biased to the side surface of a gear fixed to said differential pinion shaft and interfacing with said transmission mechanism, thereby exerting a braking action.

3. An axle driving apparatus, comprising:
an axle having a longitudinal axis;
a differential gear unit for driving said axle, comprising a verticaly disposed differential pinion shaft for interfacing with a transmission mechanism;
a speed change mechanism comprising an output shaft;
said transmission mechanism transferring power from said output shaft of said speed change mechanism to said differential gear unit;
a first driving case comprising an extension with an interior cavity wherein said extension provides means for supporting said transmission mechanism within said cavity and said extension houses means for said output shaft of said speed change mechanism to interface with said transmission mechanism;
a second driving case wherein said second driving case and said first driving case meet along a plane parallel to the longitudinal axis of said axle.

4. An axle driving apparatus of claim 3 wherein said pinion shaft has a longitudinal axis, and the plane at which said first and second driving cases meet is really coincident with said longitudinal axis of said pinion shaft.

5. An axle driving apparatus of claim 3, further comprising braking means, said braking means comprising:
a gear attached to said pinion shaft for interfacing with said transmission;
a friction pin wherein said friction pin provides braking friction in contact with said gear attached to said pinion shaft.

6. An axle driving apparatus of claim 5, wherein said friction pin comprises a longitudinal axis and said first and second driving cases meet along a plane that is parallel to said longitudinal axis of said friction pin.

7. An axle driving apparatus of claim 3 wherein said transmission mechanism comprises:
a counter gear wherein said counter gear interfaces with said output shaft of said stepless speed change mechanism and with said differential unit;
a counter gear shaft for supporting said counter gear within said cavity of said extension of said first driving case;
said extension of said first driving case comprises a counter gear shaft bore wherein said bore provides means for supporting said counter gear shaft.

8. A method of fabricating a transmission, comprising the steps of:
coupling a first O-ring to the upper end of a shaft having a lower end and an upper end;
inserting said shaft into a casing, the casing having an upper wall and a lower wall and locking means for preventing said shaft from protruding below the lower wall except upon proper angular positioning within the shaft, wherein said shaft penetrates a gear located between said upper wall and said lower wall of said casing and said lower end of said shaft protrudes below said lower wall of said casing;
coupling a second O-ring and said lower end of said shaft;
withdrawing said shaft wherein said upper end and said lower end of said shaft are supported by said upper wall and said lower wall of said casing;
engaging said locking means associated with said shaft and said casing for retaining said shaft in said casing.

9. An axle driving apparatus, comprising: a driving case, a differential gear unit and a differential pinion shaft located in said driving case, said driving case being divided into a first driving case and a second driving case wherein the intersection of said first driving case and said second driving case lies in a plane that passes through the longitudinal axis of an axle, wherein said differential gear unit and said differential pinion shaft are held between said first driving case and said second driving case, said first driving case being provided with an extension having a cavity, said extension having disposed at the outside surface thereof a stepless speed change device having an output shaft wherein said extension additionally provides means for interfacing said output shaft with a transmission mechanism for driving said differential pinion shaft in said cavity, a friction pin placed between said driving cases, said friction pin being biased to the side surface of a gear fixed to said differential pinion shaft and interfacing with said transmission mechanism, thereby exerting a braking action.

10. An axle driving apparatus, comprising:
an axle having a longitudinal axis;
a differential gear unit for driving said axle;
a speed change mechanism comprising an output shaft;
a transmission mechanism for transferring power from said output shaft of said speed change mechanism to said differential gear unit;
a first driving case comprising an extension with an interior cavity wherein said extension provides means for supporting said transmission mechanism within said cavity and said extension houses means for said output shaft of said speed change mechanism to interface with said transmission mechanism;
a second driving case wherein said second driving case and said first driving case meet along a plane parallel to the longitudinal axis of said axle;
said axle driving apparatus further comprising braking means, said braking means comprising:
a pinion shaft;
a gear attached to said pinion shaft for interfacing with said transmission;
a friction pin, wherein said friction pin provides braking friction in contact with said gear attached to said pinion shaft.

* * * * *